US012682827B2

(12) United States Patent
Tseng et al.

(10) Patent No.: US 12,682,827 B2
(45) Date of Patent: Jul. 14, 2026

(54) SCAN CONTROL LINE DRIVER MODULE AND DISPLAY PANEL

(71) Applicant: Everdisplay Optronics (Shanghai) Co., Ltd., Shanghai (CN)

(72) Inventors: Ying-Hsiang Tseng, Shanghai (CN); Lina Xiao, Shanghai (CN); Qi Wang, Shanghai (CN); Jie Liu, Shanghai (CN)

(73) Assignee: Everdisplay Optronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/695,007

(22) PCT Filed: Sep. 8, 2023

(86) PCT No.: PCT/CN2023/117717
§ 371 (c)(1),
(2) Date: Mar. 25, 2024

(87) PCT Pub. No.: WO2025/007416
PCT Pub. Date: Jan. 9, 2025

(65) Prior Publication Data

US 2026/0155085 A1 Jun. 4, 2026

(30) Foreign Application Priority Data

Jul. 6, 2023 (CN) ........................ 202310826883.0

(51) Int. Cl.
*G09G 3/22* (2006.01)

(52) U.S. Cl.
CPC ....... *G09G 3/22* (2013.01); *G09G 2310/0286* (2013.01); *G09G 2310/08* (2013.01); *G09G 2330/021* (2013.01)

(58) Field of Classification Search
CPC ................ G09G 3/22; G09G 2310/08; G09G 2310/0286; G09G 2330/021
See application file for complete search history.

(56) References Cited

U.S. PATENT DOCUMENTS

2021/0225256 A1 7/2021 Byun et al.
2022/0093046 A1 3/2022 Yan
(Continued)

FOREIGN PATENT DOCUMENTS

CN 102968956 A 3/2013
CN 104900268 A 9/2015
(Continued)

OTHER PUBLICATIONS

International Search Report dated Nov. 5, 2023 of International Application No. PCT/CN2023/117717.
(Continued)

*Primary Examiner* — Kenneth B Lee, Jr.
(74) *Attorney, Agent, or Firm* — Qinghong Xu

(57) ABSTRACT

The present disclosure relates to the field of display panels, and provides a scan control line driver module and a display panel. The scan control line driver module comprises a multi-stage scan control line driver unit; the scan control line driver unit comprises a signal input terminal, a first timing control terminal, a second timing control terminal, a scan control line driver unit circuit and a signal output terminal; the scan control line driver unit circuit includes a control module, a reset module and an output setting module.

20 Claims, 7 Drawing Sheets

(56) References Cited

U.S. PATENT DOCUMENTS

| | | | | |
|---|---|---|---|---|
| 2022/0114938 | A1* | 4/2022 | Feng | G09G 3/20 |
| 2024/0265876 | A1* | 8/2024 | Hou | G09G 3/3266 |

FOREIGN PATENT DOCUMENTS

| | | | |
|---|---|---|---|
| CN | 105702196 | A | 6/2016 |
| CN | 105989797 | A | 10/2016 |
| CN | 106683607 | A | 5/2017 |
| CN | 106782663 | A | 5/2017 |
| CN | 107492351 | A | 12/2017 |
| CN | 108573734 | A | 9/2018 |
| CN | 108597454 | A | 9/2018 |
| CN | 109308864 | A | 2/2019 |
| CN | 110675836 | A | 1/2020 |
| CN | 111785199 | A | 10/2020 |
| CN | 114038412 | A | 2/2022 |
| CN | 115083329 | A | 9/2022 |
| CN | 116682355 | A | 9/2023 |

OTHER PUBLICATIONS

Notice of Allowance dated Nov. 8, 2023 for Chinese Application No. 202310826883.0.

* cited by examiner

SCAN CONTROL LINE DRIVER MODULE AND DISPLAY PANEL

CROSS REFERENCE

The present application is a U.S. National Stage of International Application No. PCT/CN 2023/117717, filed on Sep. 8, 2023, which is based upon and claims priority to Chinese Patent Application No. 202310826883.0, filed on Jul. 6, 2023, the entire contents of both of which are incorporated herein by reference.

TECHNICAL FIELD

The present disclosure relates to the field of display panels, and in particular, to a scan control line driver module and a display panel.

BACKGROUND

A display panel includes a pixel array, and a scan control line driver module (also called a gate driving circuit) and a source driving circuit that control the pixel array. The display panel adopts a progressive scan display mode, in which the scan control line driver module is configured to generate a scanning signal to make each row of pixels turn on in turn, and the source driving circuit is configured to provide, when a row of pixels is turned on, a data signal to the row of pixels to realize display of the pixels.

The scan control line driver module includes a plurality of cascaded scan control line driver units. Each stage of the scan control line driver unit includes a scan control line driver unit circuit, which is, in general, mainly composed of several transistors. A level signal (that is, a Gout signal) is output at an output terminal of the scan control line driver unit circuit by inputting a clock signal CK and an input signal IN/in (that is, an initial pulse signal) to the scan control line drive circuit.

It should be noted that the information disclosed in the Background section above is only for enhancing the understanding of the background of the present disclosure, and thus may include information that does not constitute prior art known to those of ordinary skill in the art.

SUMMARY

The present disclosure provides a scan control line driver module and a display panel.

An aspect of the present disclosure provides a scan control line driver module, which includes a multi-stage scan control line driver unit;

the scan control line driver unit includes a signal input terminal, a first timing control terminal, a second timing control terminal, a scan control line driver unit circuit and a signal output terminal;

the scan control line driver unit circuit includes a control module, a reset module and an output setting module;

the control module includes:

a first transistor, wherein a gate of the first transistor is connected to the signal input terminal;

a second transistor, wherein a source of the second transistor is connected to the reset module, and a gate of the second transistor is connected to a drain of the first transistor;

a third transistor, wherein a source of the third transistor is connected to the drain of the first transistor, a gate of the third transistor is connected to the first timing control terminal, and a drain of the third transistor is connected to a second power supply;

a fourth transistor, wherein a source of the fourth transistor is connected to a drain of the second transistor, a gate of the fourth transistor is connected to the second timing control terminal, and a drain of the fourth transistor is connected to the second power supply; and a third capacitor, wherein a first electrode of the third capacitor is connected to the drain of the second transistor, and a second electrode of the third capacitor is connected to the drain of the first transistor;

the reset module includes:

a first node, wherein the source of the second transistor is connected to the first node;

a fifth transistor, wherein a gate of the fifth transistor is connected to the first node, and a drain of the fifth transistor is connected to the output setting module;

a sixth transistor, wherein a first terminal of the sixth transistor is connected to the second timing control terminal, a second terminal of the sixth transistor is connected to the output setting module, and a third terminal of the sixth transistor is connected to the first node;

a seventh transistor, wherein a source of the seventh transistor is connected to a first power supply, a gate of the seventh transistor is connected to the first node, and a drain of the seventh transistor is connected to the signal output terminal;

a twelfth transistor, wherein a source of the twelfth transistor is connected to the first power supply, a gate of the twelfth transistor is connected to the first timing control terminal, and a drain of the twelfth transistor is connected to a source of the fifth transistor; and a second capacitor, wherein a first electrode of the second capacitor is connected to the first power supply, and a second electrode of the second capacitor is connected to the first node.

Another aspect of the present disclosure further provides a display panel, including the scan control line driver module described in any one of the above embodiments.

It should be noted that the above general description and the following detailed description are merely exemplary and explanatory and should not be construed as limiting of the disclosure.

BRIEF DESCRIPTION OF THE DRAWINGS

The drawings here are incorporated into the specification and constitute a part of the specification, show embodiments in consistent with the present disclosure, and are used together with the specification to explain principles of the present disclosure. Obviously, the drawings in the following description are only some embodiments of the present disclosure. For those of ordinary skill in the art, other drawings can be obtained based on these drawings without creative work.

REFERENCE SIGNS

Figure 1:
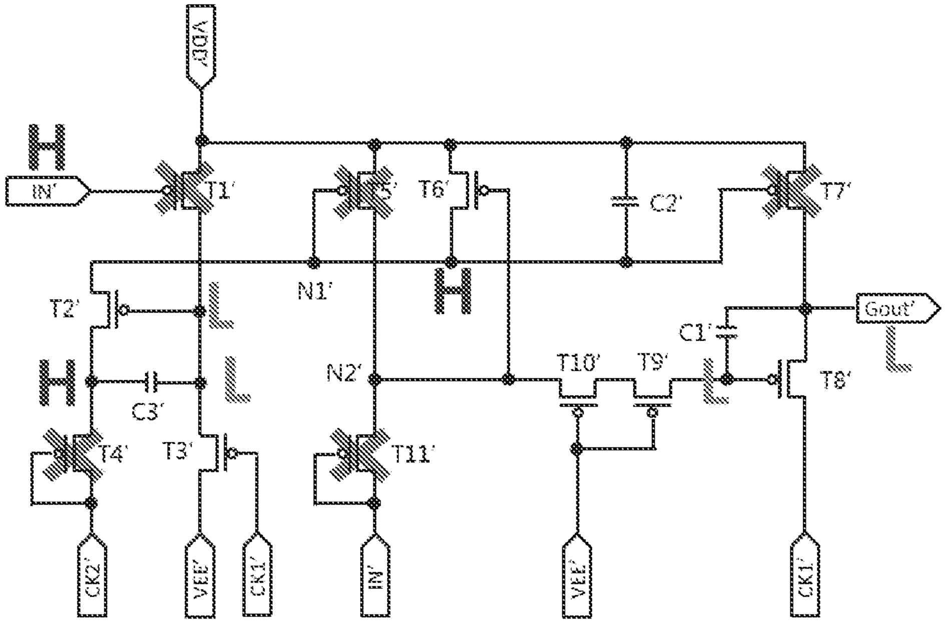
FIG. 1 is a schematic diagram of a scanning circuit disclosed in the prior art.

10' Control module in the prior art
20' Output reset module in the prior art
30' Output setting module in the prior art
10 Control module
20 Reset module
30 Output setting module
40 Display panel
41 Display area
50 Timing controller
CK1 First timing control signal
CK2 Second timing control signal
c1 First timing control terminal
c2 Second timing control terminal
IN Signal input terminal
Gout Signal output terminal
T1 First transistor
T2 Second transistor
T3 Third transistor
T4 Fourth transistor
T5 Fifth transistor
T6 Sixth transistor
T7 Seventh transistor
T8 Eighth transistor
T9 Ninth transistor
T10 Tenth transistor
T11 Eleventh transistor
T12 Twelfth transistor
C1 First capacitor
C2 Second capacitor
C3 Third capacitor
VDD Fist power supply
VEE Second power supply
a First node
b Second node
c Third node

DETAILED DESCRIPTION

Example embodiments will now be described more fully with reference to the accompanying drawings. However, the example embodiments can be implemented in a variety of forms and should not be construed as being limited to implementations set forth herein. Rather, these embodiments are provided so that the present disclosure will be thorough and complete so as to convey the idea of the example embodiments to those skilled in this art. The same reference numerals in the drawings denote the same or similar structures, and the detailed description thereof will be omitted.

The use of “first”, “second” and similar words in specific descriptions does not imply any order, quantity or importance, but is only used to distinguish different components. In addition, in the description of the present disclosure, an orientation or positional relationship indicated by a term “upper”, “lower”, etc. is based on an orientation or positional relationship shown in the drawings, which is only for convenience of description and does not indicate or imply that the indicated device or element must have a specific orientation, be constructed and operate in the specific orientation, and therefore are not to be construed as limitations of the present disclosure.

It should be noted that, as long as there is no conflict, embodiments of the present disclosure and features in different embodiments can be combined with each other.

Figure 2:
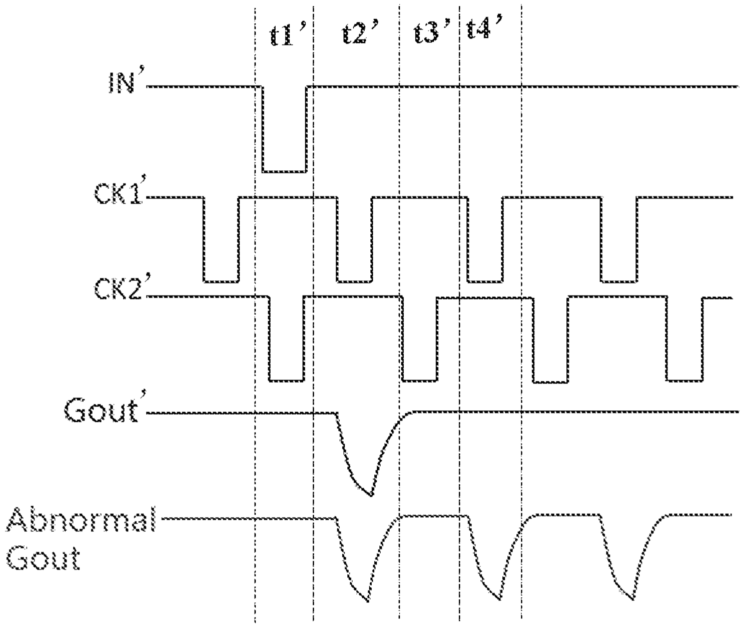
FIG. 2 is a driving timing diagram of a scanning circuit disclosed in the prior art.

In the prior art, as shown in FIGS. 1 and 2, FIG. 1 shows a circuit diagram of a scan control line driver unit circuit in the prior art, and FIG. 2 shows a waveform diagram of the scan control line driver unit circuit shown in FIG. 1. As shown in FIG. 1, at a time t2', the scan control line driver unit outputs a low-level first clock signal CK1' through an eighth transistor T8'. Under normal circumstances, when the scan control line driver unit enters a time t3', a second clock signal CK2' is at a low level to make a fourth transistor T4' turn on, a first node N1' changes from an original high level to a low level to make a fifth transistor T5' and a seventh transistor T7' turn on, a second node N2' turns to a high level due to the turning on of the fifth transistor T5', the eighth transistor T8' is turned off, and the seventh transistor T7' is turned on to output a high-level VDD' signal. However, upon the entering of the time t3', if a potential written by the first node N1' is relatively high due to the excessive CK2' trace resistance, threshold voltage shifts of a second transistor T2' and the fourth transistor T4' for a long time operation and other factors, the fifth transistor T5' is caused to be turned on slowly or unable to be turned on, causing an update failure of a potential at the time t2' of the second node N2' to still maintain a low potential; a sixth transistor T6' is continuously on to allow VDD' to be written to the first node N1', a potential of the first node N1' is higher, and a gate voltage of the fifth transistor T5' is larger, which causes the seventh transistor T7' to turn off, the eighth transistor T8' to turn on, and Gout' to continuously output an abnormal waveform of CK1' (the Abnormal Gout waveform shown in FIG. 2), causing the failure of a display picture. Therefore, it is necessary to solve the abnormal output problem of the scan control line driver unit caused by the abnormal update of the potentials of the first node N1' and the second node N2' due to the mutual interference between the fifth transistor T5' and the sixth transistor T6.

Figure 3:
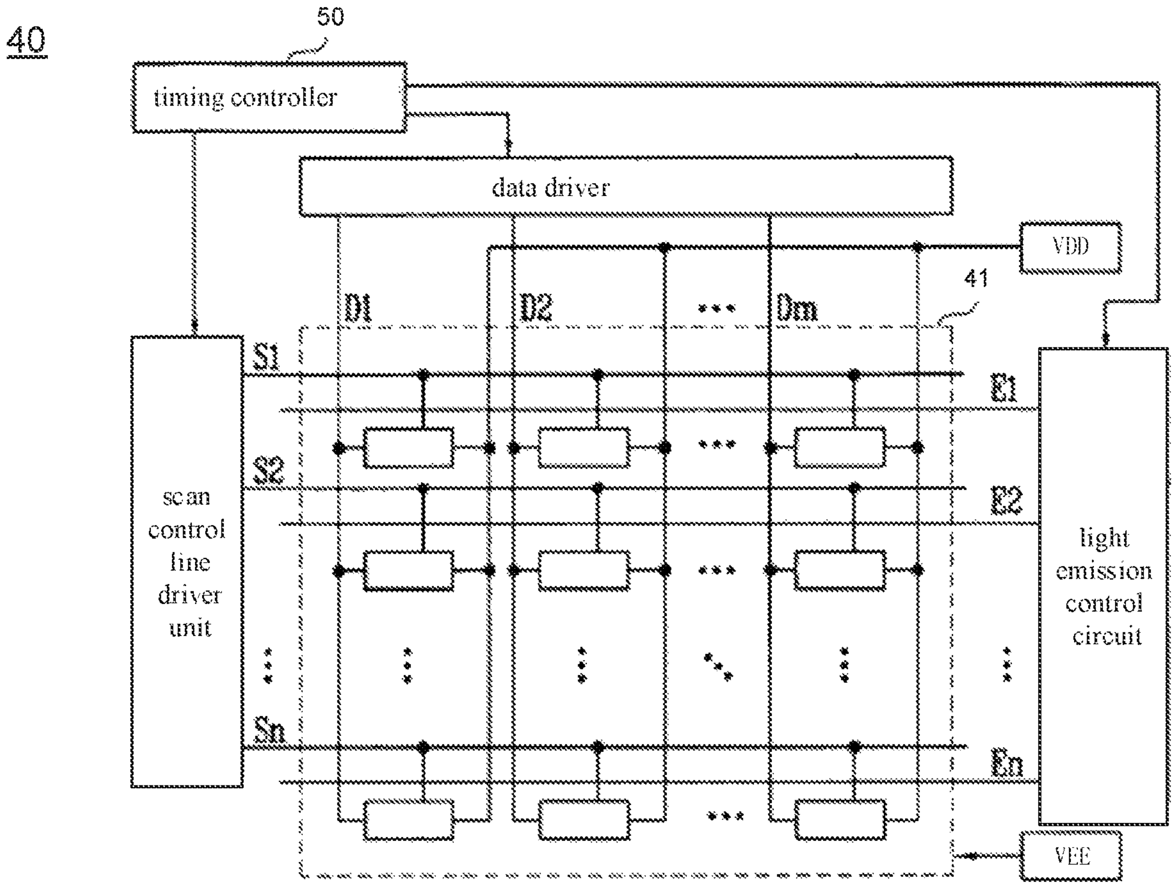
FIG. 3 shows a schematic diagram of a display panel of the present disclosure.
Figure 4:
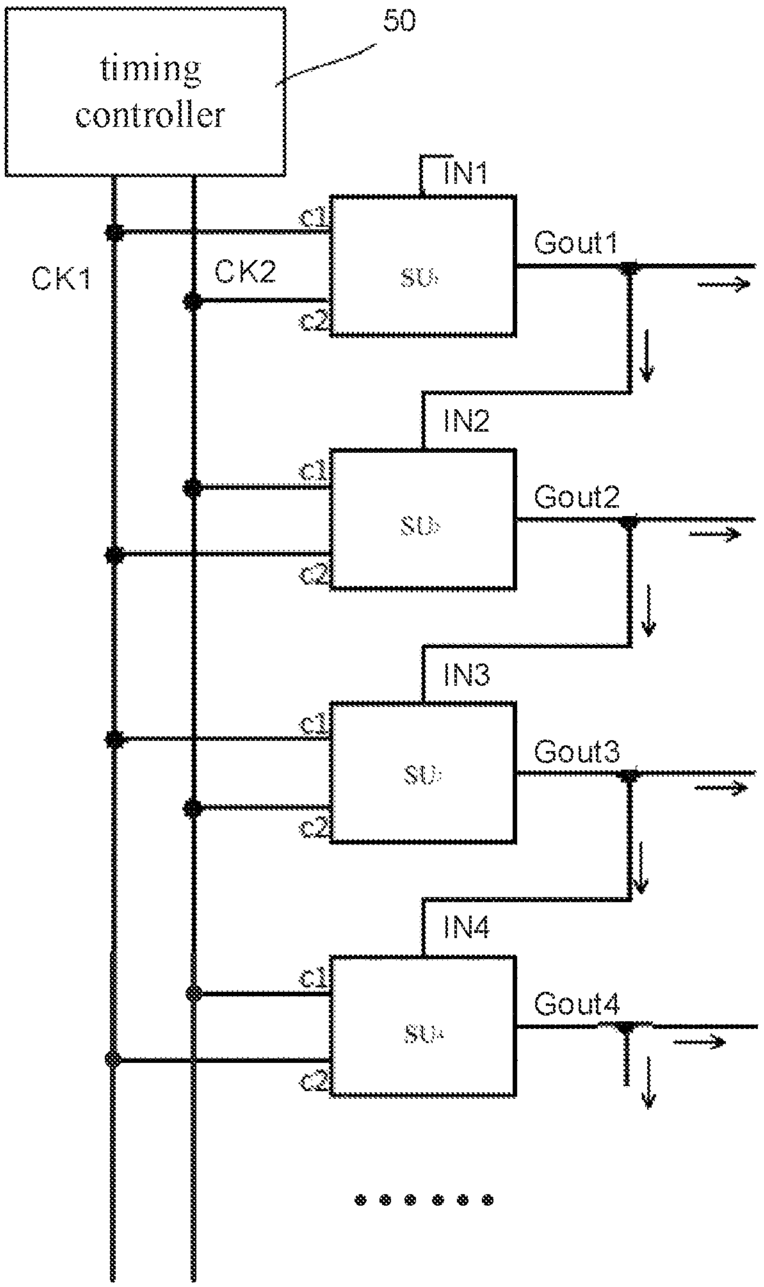
FIG. 4 shows a schematic diagram of a scan control line driver module of the present disclosure.

The inventor of the present disclosure provides a solution to the problems existing in the prior art through detailed and in-depth research. As shown in FIGS. 3 and 4, FIG. 3 shows a schematic diagram of a display panel of the present disclosure, and FIG. 4 shows a schematic diagram of a scan control line driver module of the present disclosure. The present disclosure discloses a scan control line driver module, which includes a multi-stage scan control line driver unit SU. The scan control line driver unit SU includes a signal input terminal IN, a first timing control terminal c1, a second timing control terminal c2, a scan control line driver unit circuit and a signal output terminal Gout. The scan control line driver unit circuit includes a control module 10, a reset module 20 and an output setting module 30. A twelfth transistor T12 is added to a source of a fifth transistor T5 of the reset module 20, and part of traces of the control module 10 and the reset module 20 are changed, thereby obtaining a new 12T3C scan control line driver unit circuit. By providing the new 12T3C scanning circuit, the scan control line driver module and the display panel of the present disclosure solve mutual interference between transistors, make the scanning circuit more stable, avoid an abnormal display phenomenon caused by a threshold voltage shift or transistor aspect ratio fluctuation caused by a manufacturing process error, and increase a service life of the display panel.

Specific embodiments of the present disclosure will be described in further detail below with reference to the accompanying drawings.

As shown in FIG. 3, the present disclosure provides a display panel 40, which includes a display area 41 and a non-display area. The scan control line driver module, a data driver and a light emission control module are located in the non-display area of the display panel 40. The display area 41 includes light emission pixels and pixel circuits arranged in an array. The light emission pixel emits light under the joint action of the scan control line driver module, the data driver, the light emission control module and the pixel circuit.

As shown in FIG. 4, the present disclosure further provides a scan control line driver module, which includes a multi-stage scan control line driver unit SU and a timing controller 50.

In some embodiments of the present disclosure, the scan control line driver unit SU includes a signal input terminal IN, a first timing control terminal c1, a second timing control terminal c2, a scan control line driver unit circuit and a signal output terminal Gout. Each stage of scan control line driver unit SU outputs a scanning signal, which is input to a row of pixel circuits in the display area 41 of the display panel 40 to drive the row of pixels to emit light. A previous-stage scan control line driver unit SU simultaneously outputs the scanning signal to a signal input terminal IN of a next-stage scan control line driver unit SU as an initial signal. A scanning signal output by the last-stage scan control line driver unit SU is only input to a row of pixel circuits, since the last-stage scan control line driver unit SU does not have a next-stage scan control line driver unit.

Specifically, four cascaded scan control line driver units SU are taken as an example in FIG. 4. A signal input terminal IN1 of a first-stage scan control line driver unit SU1 inputs an initial pulse signal. A signal output terminal Gout1 of the first-stage scan control line driver unit SU1 outputs a scanning signal as an input signal of a second-stage scan control line driver unit SU2, and the signal output terminal Gout1 of the first-stage scan control line driver unit SU1 is connected to a signal input terminal IN2 of the second-stage scan control line driver unit SU2. A signal output terminal Gout2 of the second-stage scan control line driver unit SU2 outputs a scanning signal as an input signal of a third-stage scan control line driver unit SU3, and the signal output terminal Gout2 of the second-stage scan control line driver unit SU2 is connected to a signal input terminal IN3 of the third-stage scan control line driver unit SU3. A signal output terminal Gout3 of the third-stage scan control line driver unit SU3 outputs a scanning signal as an input signal of a fourth-stage scan control line driver unit SU4, and the signal output terminal Gout3 of the third-stage scan control line driver unit SU3 is connected to a signal input terminal IN4 of the fourth-stage scan control line driver unit SU4, and so on. Subsequent-stage scan control line driver units repeat like this to form the scan control line driver module.

In some embodiments of the present disclosure, the timing controller 50 includes a first clock signal line and a second clock signal line. The first clock signal line is configured to output a first timing control signal CK1, and the second clock signal line is configured to output a second timing control signal CK2. The first timing control signal CK1 and the second timing control signal CK2 are square wave signals with the same output frequency and a phase difference of 180°.

In some embodiments of the present disclosure, with continued reference to FIG. 4, a first timing control terminal c1 of an odd-stage scan control line driver unit SU is connected to the first clock signal line, and is configured to receive the first timing control signal CK1, and a second timing control terminal c2 of the odd-stage scan control line driver unit SU is connected to the second clock signal line, and is configured to receive the second timing control signal CK2. A first timing control terminal c1 of an even-stage scan control line driver unit SU is connected to the second clock signal line, and is configured to receive the second timing control signal CK2, and a second timing control terminal c2 of the even-stage scan control line driver unit SU is connected to the first clock signal line, and is configured to receive the first timing control signal CK1.

In some embodiments of the present disclosure, the scan control line driver unit circuit includes a control module 10, a reset module 20 and an output setting module 30. The scan control line driver unit circuit is configured to perform delay processing on a signal received from the signal input terminal IN under the control of the first timing control signal CK1 and the second timing control signal CK2. The processed signal is output by the signal output terminal Gout, and this signal is output to the display area 41 as a scanning signal or input to a signal input terminal IN of the next-stage scan control line driver unit circuit.

Figure 5:
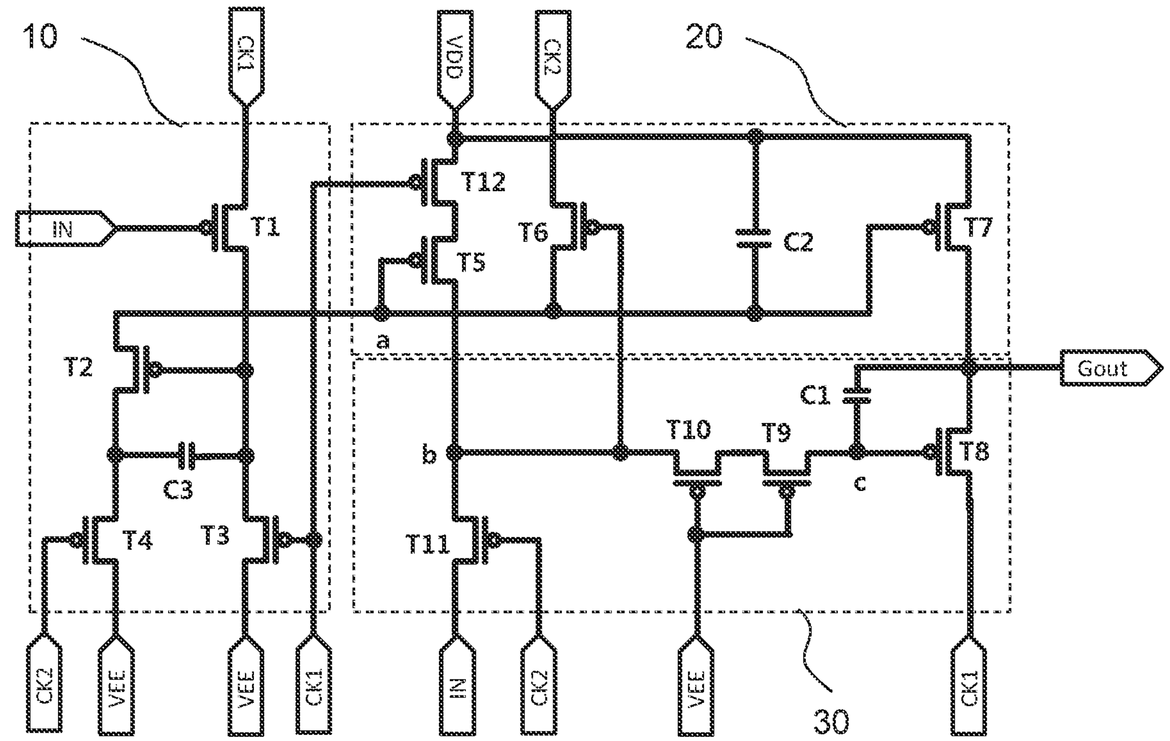
FIG. 5 shows a circuit diagram of a scan control line driver unit circuit in a an embodiment of the present disclosure.
Figure 6:
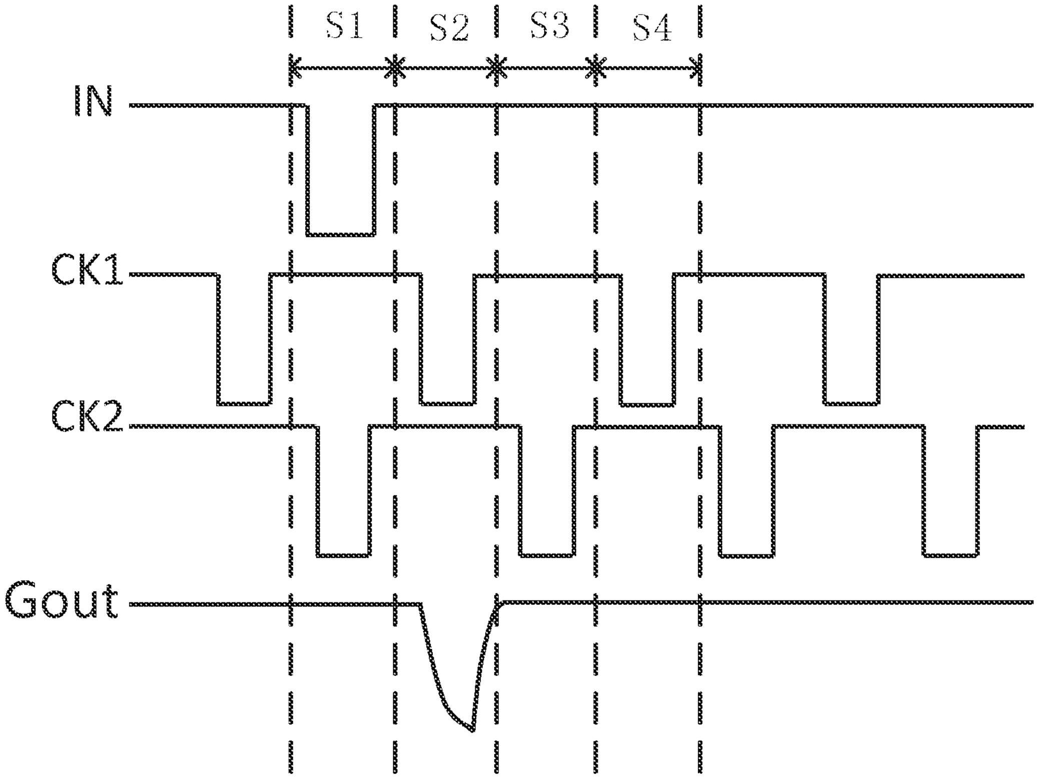
FIG. 6 shows a waveform diagram of the scan control line driver unit circuit shown in FIG. 5.
Figure 7:
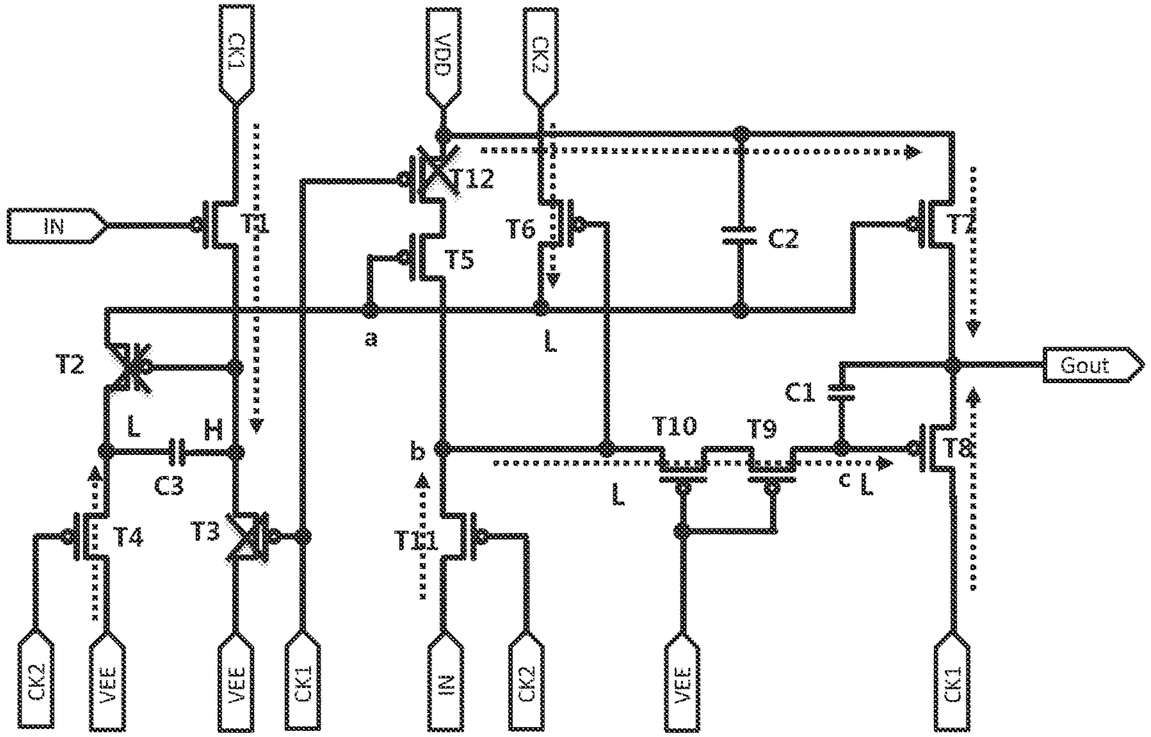
FIG. 7 shows a schematic diagram of a conduction state of the scan control line driver unit circuit in FIG. 5 in a S1 phase.
Figure 8:
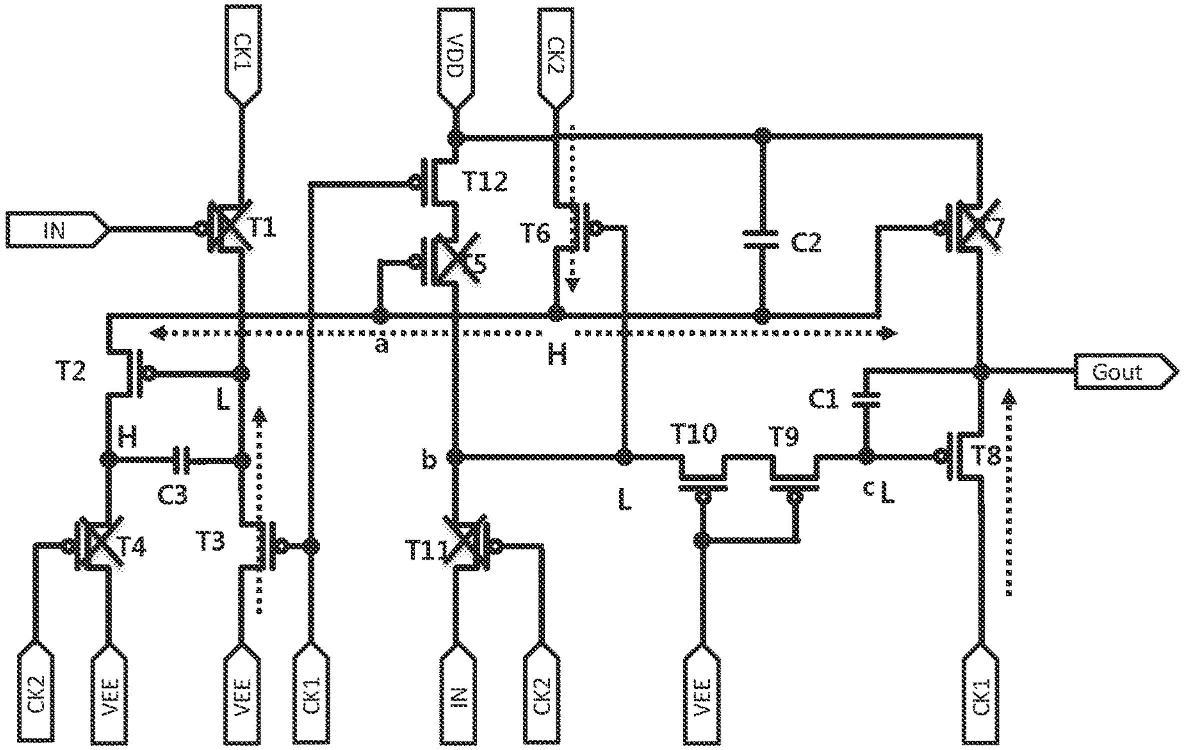
FIG. 8 shows a schematic diagram of a conduction state of the scan control line driver unit circuit in FIG. 5 in a S2 phase.
Figure 9:
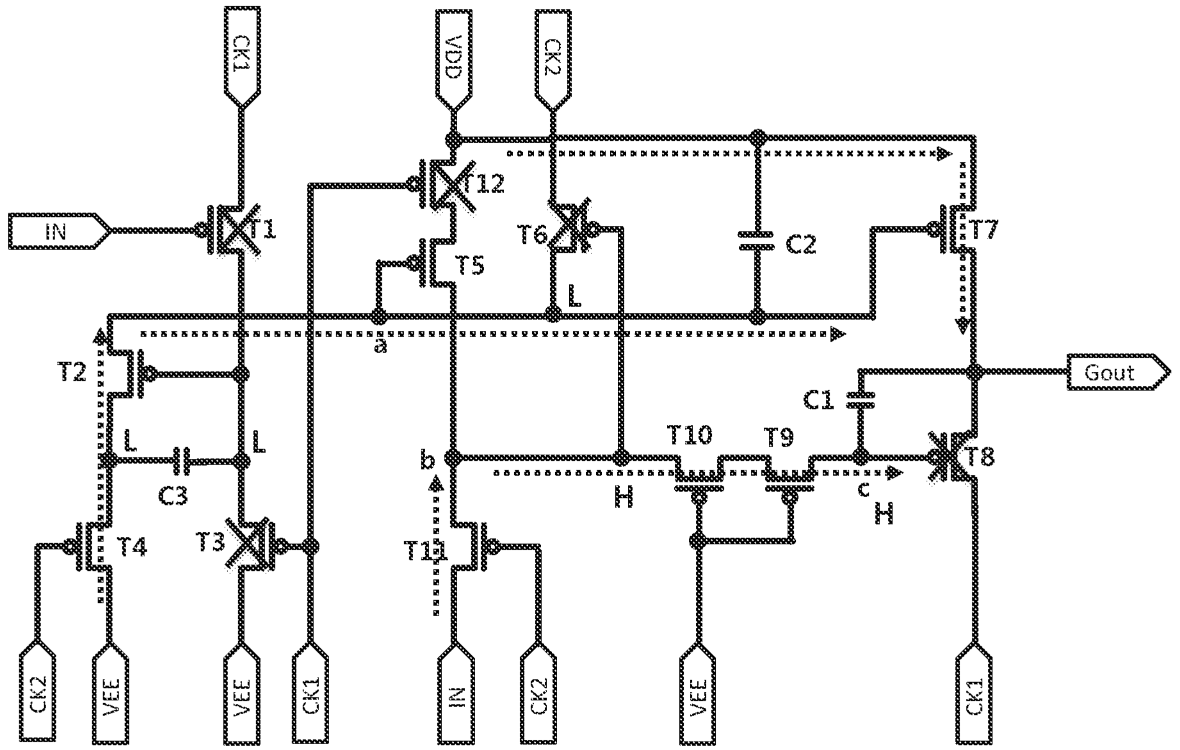
FIG. 9 shows a schematic diagram of a conduction state of the scan control line driver unit circuit in FIG. 5 in a S3 phase.
Figure 10:
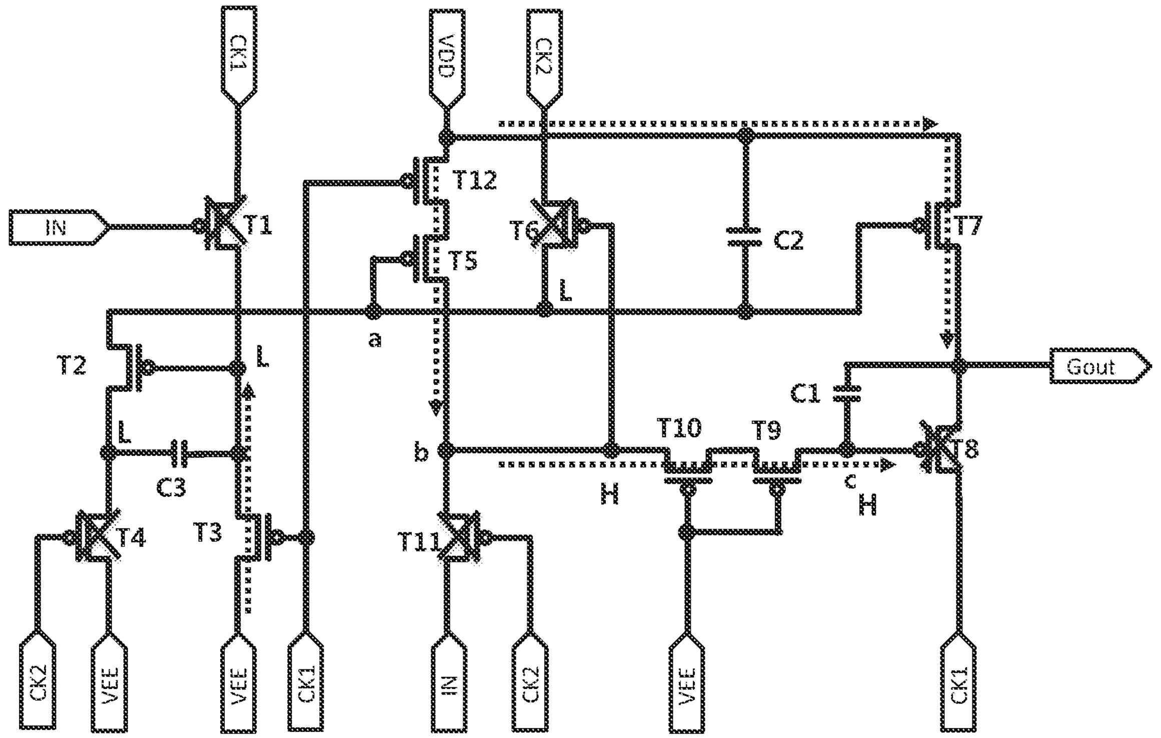
FIG. 10 shows a schematic diagram of a conduction state of the scan control line driver unit circuit in FIG. 5 in a S4 phase.

FIGS. 5-10 show an embodiment of the present disclosure, where FIG. 5 shows a circuit diagram of a scan control line driver unit circuit in an embodiment of the present disclosure, FIG. 6 shows a waveform diagram of the scan control line driver unit circuit shown in FIG. 5, FIG. 7 shows a schematic diagram of a conduction state of the scan control line driver unit circuit in FIG. 5 in a S1 phase, FIG. 8 shows a schematic diagram of a conduction state of the scan control line driver unit circuit in FIG. 5 in a S2 phase, FIG. 9 shows a schematic diagram of a conduction state of the scan control line driver unit circuit in FIG. 5 in a S3 phase, and FIG. 10 shows a schematic diagram of a conduction state of the scan control line driver unit circuit in FIG. 5 in a S4 phase. In addition to the above technical features, the embodiment of the present disclosure further includes the following technical features.

As shown in FIG. 5, the control module 10 includes: a first transistor T1, where a source of the first transistor T1 is connected to the first timing control terminal c1, and a gate of the first transistor T1 is connected to the signal input terminal IN; a second transistor T2, where a source of the second transistor T2 is connected to the reset module 20, and a gate of the second transistor T2 is connected to a drain of the first transistor T1; a third transistor T3, where a source of the third transistor T3 is connected to the drain of the first transistor T1, a gate of the third transistor T3 is connected to the first timing control terminal c1, and a drain of the third transistor T3 is connected to a second power supply VEE; a fourth transistor T4, where a source of the fourth transistor T4 is connected to a drain of the second transistor T2, a gate of the fourth transistor T4 is connected to the second timing control terminal c2, and a drain of the fourth transistor T4 is connected to the second power supply VEE; and a third capacitor C3, where a first electrode of the third capacitor C3 is connected to the drain of the second transistor T2, and a second electrode of the third capacitor C3 is connected to the drain of the first transistor T1.

With continued reference to FIG. 5, the reset module 20 includes: a first node a, where the source of the second transistor T2 is connected to the first node a; a fifth transistor T5, where a gate of the fifth transistor T5 is connected to the first node a, and a drain of the fifth transistor T5 is connected to the output setting module 30; a sixth transistor T6, where a first terminal of the sixth transistor T6 is connected to the second timing control terminal c2, a second terminal of the sixth transistor T6 is connected to the output setting module 30, and a third terminal of the sixth transistor T6 is connected to the first node a; a seventh transistor T7, where a source of the seventh transistor T7 is connected to a first power supply VDD, a gate of the seventh transistor T7 is connected to the first node a, and a drain of the seventh transistor T7 is connected to the signal output terminal Gout; a twelfth transistor T12, where a source of the twelfth transistor T12 is connected to the first power supply VDD, a gate of the twelfth transistor T12 is connected to the first timing control terminal c1, and a drain of the twelfth transistor T12 is connected to a source of the fifth transistor T5; and a second capacitor C2, where a first electrode of the second capacitor C2 is connected to the first power supply VDD, and a second electrode of the second capacitor C2 is connected to the first node a.

With continued reference to FIG. 5, the output setting module 30 includes: a second node b, where the drain of the fifth transistor T5 is connected to the second node b, and the second terminal of the sixth transistor T6 is connected to the second node b; an eighth transistor T8, where a source of the eighth transistor T8 is connected to the signal output terminal Gout, and a drain of the eighth transistor T8 is connected to the first timing control terminal c1; a ninth transistor T9, where a gate of the ninth transistor T9 is connected to the second power supply VEE, and a drain of the ninth transistor T9 is connected to a gate of the eighth transistor T8; a tenth transistor T10, where a source of the tenth transistor T10 is connected to the second node b, a gate of the tenth transistor T10 is connected to the second power supply VEE, and a drain of the tenth transistor T10 is connected to a source of the ninth transistor T9; an eleventh transistor T11, where a first terminal of the eleventh transistor T11 is connected to the second node b, a second terminal of the eleventh transistor T11 is connected to the second timing control terminal c2, and a third terminal of the eleventh transistor T11 is connected to the signal input terminal IN; and a capacitor C1, where a first electrode of the first capacitor C1 is connected to the signal output terminal Gout, and a second electrode of the first capacitor C1 is connected to the gate of the eighth transistor T8.

In embodiments of the present disclosure, the first transistor T1 to the twelfth transistor T12 are all P-type MOS transistors. A control terminal of the PMOS transistor is the gate, a first terminal of the PMOS transistor is the source, and a second terminal of the PMOS transistor is the drain. An on-level of the PMOS transistor is a low level, and an off-level of the PMOS transistor is a high level. In some other embodiments of the present disclosure, the scan control line driver unit provided by the present disclosure can changed to all N-type transistors. Alternatively, the scan control line driver unit provided by the present disclosure can be changed to all CMOS transistors.

In embodiments of the present disclosure, referring to FIG. 6, the waveform diagram shown in FIG. 6 includes four processes: S1, S2, S3 and S4. In these four processes, the output signal of the signal output terminal Gout of the scan control line driver unit circuit completes a process from setting to resetting. It should be noted that, for the convenience of understanding, a high-level signal is represented by "H", and a low-level signal is represented by "L" in the drawings. A relationship between an input and an output of the scan control line driver unit circuit in the above four processes is analyzed below in conjunction with the waveform diagram in FIG. 6 and the circuit diagram in FIG. 5.

In embodiments of the present disclosure, referring to FIGS. 6 and 7, in the S1 process, the signal input terminal IN inputs a low level, the first timing control signal CK1 inputs a high level, and the second timing control signal CK2 inputs a low level. In this case, the first transistor T1, the fourth transistor T4, the fifth transistor T5, the sixth transistor T6, the seventh transistor T7, the eighth transistor T8, the ninth transistor T9, the tenth transistor T10 and the eleventh transistor T11 are turned on, and the second transistor T2, the third transistor T3 and the twelfth transistor T12 are turned off. In this process, first, the first transistor T1, the fourth transistor T4, the ninth transistor T9, the tenth transistor T10 and the eleventh transistor T11 are turned on, the low level is written to the second node b by the signal input terminal IN through the eleventh transistor T11, and the sixth transistor T6 is turned on. Then, the low level is written to the first node a by the second timing control signal CK2 through the sixth transistor T6, and the seventh transistor T7 is turned on. At the same time, the low level is written to a third node c through the ninth transistor T9 and the tenth transistor T10, and the eighth transistor T8 is turned on. Finally, the first power supply VDD and the first timing control signal CK1 simultaneously output high levels to the signal output terminal Gout. Potential updates of the first node a and the second node b do not affect or interfere with each other, ensuring the correctness of the output waveform.

In embodiments of the present disclosure, referring to FIGS. 6 and 8, in the S2 process, the signal input terminal IN inputs a high level, the first timing control signal CK1 inputs a low level, and the second timing control signal CK2 inputs a high level. In this case, the second transistor T2, the third transistor T3, the sixth transistor T6, the eighth transistor T8, the ninth transistor T9, the tenth transistor T10 and the twelfth transistor T12 are turned on, and the first transistor T1, the fourth transistor T4, the fifth transistor T5, the seventh transistor T7 and the eleventh transistor T11 are turned off. In this process, first, the third transistor T3 is turned on by the first timing control signal CK1, and the second power supply VEE is written through the third transistor T3 and turns on the second transistor T2. Then, the first node a is refreshed to the high level by the second timing control signal CK2 through the sixth transistor T6, and the seventh transistor T7 is turned off. Finally, a low-level signal of the first timing control signal CK1 is output by the signal output terminal Gout through the eighth transistor T8. In addition, as shown in FIG. 10, the fifth transistor T5 is turned on. Then the high potential is written to the second node b by the first power supply VDD, the third node c is refreshed to the high level through the ninth transistor T9 and the tenth transistor T10, and the eighth transistor T8 is turned off. Finally, the signal output terminal Gout outputs a high level signal of the first power supply VDD. The potential updates of the first node a and the second node b do not affect or interfere with each other, ensuring the correctness of the output waveform.

The scan control line drive unit SU repeats the S3 process and the S4 process in the subsequent work steps, which will not be repeated here, until the S1 to S2 work steps are started again when the next frame starts to be displayed.

To sum up, in embodiments of the present disclosure, the relationship between the input and the output of the scan control line driver unit SU is that: if the signal input terminal IN is at the low level before the arrival of a falling edge signal of the first timing control signal CK1, then the signal output terminal Gout also outputs the low level after the arrival of the falling edge signal of the first timing control signal CK1, until a falling edge signal of the second timing control signal CK2 arrives. This is equivalent to performing the delay processing on the low-level signal from the signal input terminal IN and then outputting it from the signal output terminal Gout. If the signal input terminal IN remains at the high level, the signal output by the signal output terminal Gout also remains at the high level.

Figure 11:
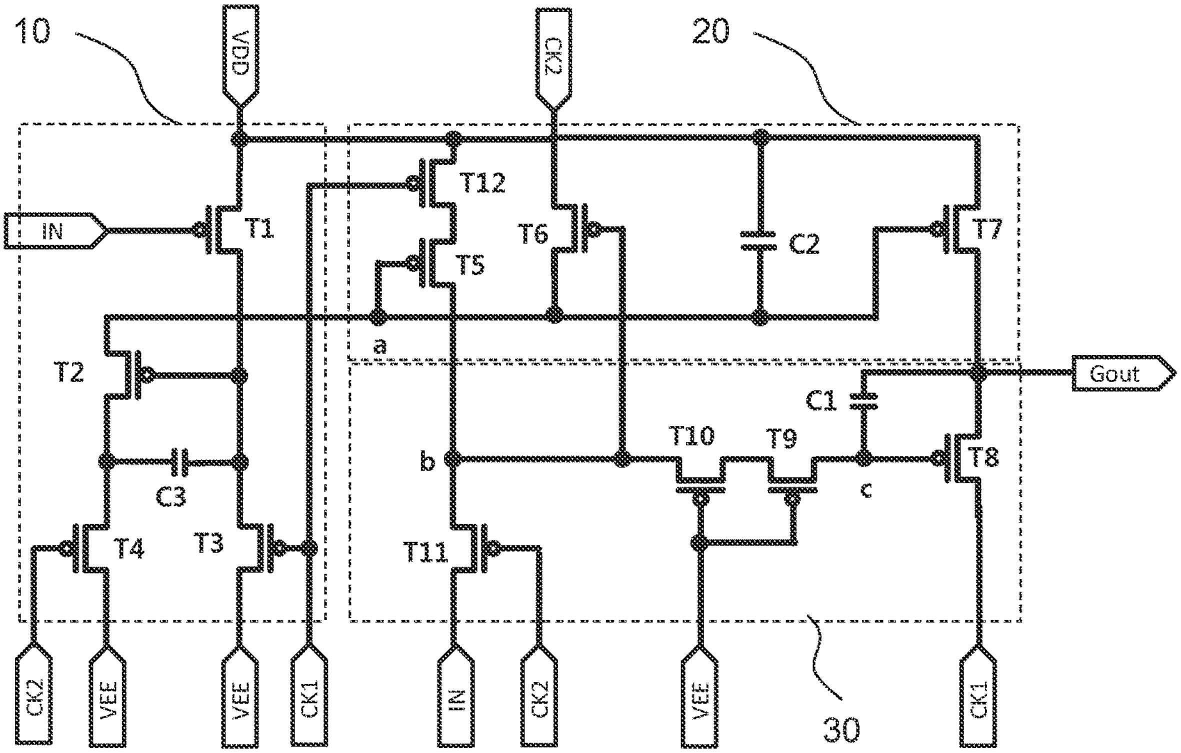
FIG. 11 shows a circuit diagram of a scan control line driver unit circuit in another embodiment of the present disclosure.

FIG. 11 shows a circuit diagram of a scan control line driver unit circuit in another embodiment of the present disclosure. In embodiments of the present disclosure, except that the source of the first transistor T1 is connected to the first power supply VDD, other technical features are the same as those in the above embodiment. This embodiment can also achieve the same technical effects as the above embodiment, which will not be described again here.

In summary, the scan control line driver module and the display panel of the present disclosure provide the new 12T3C scanning circuit. The twelfth transistor T12 is added to the source of the fifth transistor T5 of the reset module 20, and part of traces of the control module 10 and the reset module 20 are changed, which solves the mutual interference between the fifth transistor T5 and the sixth transistor T6, ensures that the potential updates of the first node a and the second node b do not affect or interfere with each other, ensures the correctness of the output waveform, makes the scanning circuit more stable, avoids the abnormal display phenomenon caused by the threshold voltage shift or the transistor aspect ratio fluctuation caused by the manufacturing process error, and increases the service life of the display panel.

The above content is a further detailed description of the present disclosure in conjunction with specific embodiments, and it cannot be determined that specific implementations of the present disclosure are limited to these descriptions. For those of ordinary skill in the technical field to which the present disclosure belongs, several simple deductions or substitutions can be made without departing from the concept of the present disclosure, and all of them should be regarded as belonging to the protection scope of the present disclosure.

What is claimed is:

1. A scan control line driver module, comprising a multi-stage scan control line driver unit;

the scan control line driver unit comprises a signal input terminal, a first timing control terminal, a second timing control terminal, a scan control line driver unit circuit and a signal output terminal;

the scan control line driver unit circuit comprises a control module, a reset module and an output setting module;

the control module comprises:

a first transistor, wherein a gate of the first transistor is connected to the signal input terminal;

a second transistor, wherein a source of the second transistor is connected to the reset module, and a gate of the second transistor is connected to a drain of the first transistor;

a third transistor, wherein a source of the third transistor is connected to the drain of the first transistor, a gate of the third transistor is connected to the first timing control terminal, and a drain of the third transistor is connected to a second power supply;

a fourth transistor, wherein a source of the fourth transistor is connected to a drain of the second transistor, a gate of the fourth transistor is connected to the second timing control terminal, and a drain of the fourth transistor is connected to the second power supply; and a third capacitor, wherein a first electrode of the third capacitor is connected to the drain of the second transistor, and a second electrode of the third capacitor is connected to the drain of the first transistor;

the reset module comprises:

a first node, wherein the source of the second transistor is connected to the first node;

a fifth transistor, wherein a gate of the fifth transistor is connected to the first node, and a drain of the fifth transistor is connected to the output setting module;

a sixth transistor, wherein a first terminal of the sixth transistor is connected to the second timing control terminal, a second terminal of the sixth transistor is connected to the output setting module, and a third terminal of the sixth transistor is connected to the first node;

a seventh transistor, wherein a source of the seventh transistor is connected to a first power supply, a gate of the seventh transistor is connected to the first node, and a drain of the seventh transistor is connected to the signal output terminal;

a twelfth transistor, wherein a source of the twelfth transistor is connected to the first power supply, a gate of the twelfth transistor is connected to the first timing control terminal, and a drain of the twelfth transistor is connected to a source of the fifth transistor; and a second capacitor, wherein a first electrode of the second capacitor is connected to the first power supply, and a second electrode of the second capacitor is connected to the first node.

2. The scan control line driver module according to claim 1, wherein a source of the first transistor is connected to the first timing control terminal.

3. The scan control line driver module according to claim 1, wherein a source of the first transistor is connected to the first power supply.

4. The scan control line driver module according to claim 2, wherein the output setting module comprises:

a second node, wherein the drain of the fifth transistor is connected to the second node, and the second terminal of the sixth transistor is connected to the second node;

an eighth transistor, wherein a source of the eighth transistor is connected to the signal output terminal, and a drain of the eighth transistor is connected to the first timing control terminal;

a ninth transistor, wherein a gate of the ninth transistor is connected to the second power supply, and a drain of the ninth transistor is connected to a gate of the eighth transistor;

a tenth transistor, wherein a source of the tenth transistor is connected to the second node, a gate of the tenth transistor is connected to the second power supply, and a drain of the tenth transistor is connected to a source of the ninth transistor;

an eleventh transistor, wherein a first terminal of the eleventh transistor is connected to the second node, a second terminal of the eleventh transistor is connected to the second timing control terminal, and a third terminal of the eleventh transistor is connected to the signal input terminal; and a first capacitor, wherein a first electrode of the first capacitor is connected to the signal output terminal, and a second electrode of the first capacitor is connected to the gate of the eighth transistor.

5. The scan control line driver module according to claim 1, further comprising: a timing controller, configured to output a first timing control signal and a second timing control signal.

6. The scan control line driver module according to claim 5, wherein the scan control line driver unit circuit is configured to perform delay processing on a signal received from the signal input terminal under control of the first timing control signal and the second timing control signal, and the processed signal is output by the signal output terminal.

7. The scan control line driver module according to claim 5, wherein a scanning signal is output by a previous-stage scan control line driver unit to a next-stage scan control line driver unit, and a scanning signal is output by a last-stage scan control line driver unit.

8. The scan control line driver module according to claim 5, wherein a first timing control terminal of an odd-stage scan control line driver unit is configured to receive the first timing control signal, and a second timing control terminal of the odd-stage scan control line driver unit is configured to receive the second timing control signal.

9. The scan control line driver module according to claim 5, wherein a first timing control terminal of an even-stage scan control line driver unit is configured to receive the second timing control signal, and a second timing control terminal of the even-stage scan control line driver unit is configured to receive the first timing control signal.

10. The scan control line driver module according to claim 5, wherein the timing controller comprises a first clock signal line configured to output the first timing control signal and a second clock signal line configured to output the second timing control signal, and the first timing control signal and the second timing control signal are square wave signals with the same output frequency and a phase difference of 180°.

11. The scan control line driver module according to claim 4, wherein the first to twelfth transistors are all P-type MOS transistors.

12. A display panel, comprising a scan control line driver module, wherein the scan control line driver module comprises a multi-stage scan control line driver unit;

the scan control line driver unit comprises a signal input terminal a first timing control terminal, a second timing control terminal, a scan control line driver unit circuit and a signal output terminal;

the scan control line driver unit circuit comprises a control module a reset module and an output setting module;

the control module comprises:

a first transistor, wherein a gate of the first transistor is connected to the signal input terminal;

a second transistor, wherein a source of the second transistor is connected to the reset module, and a gate of the second transistor is connected to a drain of the first transistor;

a third transistor, wherein a source of the third transistor is connected to the drain of the first transistor, a gate of the third transistor is connected to the first timing control terminal, and a drain of the third transistor is connected to a second power supply;

a fourth transistor, wherein a source of the fourth transistor is connected to a drain of the second transistor, a gate of the fourth transistor is connected to the second timing control terminal, and a drain of the fourth transistor is connected to the second power supply; and a third capacitor, wherein a first electrode of the third capacitor is connected to the drain of the second transistor, and a second electrode of the third capacitor is connected to the drain of the first transistor;

the reset module comprises:

a first node, wherein the source of the second transistor is connected to the first node;

a fifth transistor, wherein a gate of the fifth transistor is connected to the first node, and a drain of the fifth transistor is connected to the output setting module;

a sixth transistor, wherein a first terminal of the sixth transistor is connected to the second timing control terminal, a second terminal of the sixth transistor is connected to the output setting module, and a third terminal of the sixth transistor is connected to the first node;

a seventh transistor, wherein a source of the seventh transistor is connected to a first power supply, a gate of the seventh transistor is connected to the first node, and a drain of the seventh transistor is connected to the signal output terminal;

a twelfth transistor, wherein a source of the twelfth transistor is connected to the first power supply, a gate of the twelfth transistor is connected to the first timing control terminal, and a drain of the twelfth transistor is connected to a source of the fifth transistor; and a second capacitor, wherein a first electrode of the second capacitor is connected to the first power supply, and a second electrode of the second capacitor is connected to the first node.

13. The scan control line driver module according to claim 3, wherein the output setting module comprises:

a second node, wherein the drain of the fifth transistor is connected to the second node, and the second terminal of the sixth transistor is connected to the second node;

an eighth transistor, wherein a source of the eighth transistor is connected to the signal output terminal, and a drain of the eighth transistor is connected to the first timing control terminal;

a ninth transistor, wherein a gate of the ninth transistor is connected to the second power supply, and a drain of the ninth transistor is connected to a gate of the eighth transistor;

a tenth transistor, wherein a source of the tenth transistor is connected to the second node, a gate of the tenth transistor is connected to the second power supply, and a drain of the tenth transistor is connected to a source of the ninth transistor;

an eleventh transistor, wherein a first terminal of the eleventh transistor is connected to the second node, a second terminal of the eleventh transistor is connected to the second timing control terminal, and a third terminal of the eleventh transistor is connected to the signal input terminal; and a first capacitor, wherein a first electrode of the first capacitor is connected to the signal output terminal, and a second electrode of the first capacitor is connected to the gate of the eighth transistor.

14. The display panel according to claim 12, wherein a source of the first transistor is connected to the first timing control terminal.

15. The display panel according to claim 12, wherein a source of the first transistor is connected to the first power supply.

16. The display panel according to claim 14, wherein the output setting module comprises:

a second node, wherein the drain of the fifth transistor is connected to the second node, and the second terminal of the sixth transistor is connected to the second node;

an eighth transistor, wherein a source of the eighth transistor is connected to the signal output terminal, and a drain of the eighth transistor is connected to the first timing control terminal;

a ninth transistor, wherein a gate of the ninth transistor is connected to the second power supply, and a drain of the ninth transistor is connected to a gate of the eighth transistor;

a tenth transistor, wherein a source of the tenth transistor is connected to the second node, a gate of the tenth transistor is connected to the second power supply, and a drain of the tenth transistor is connected to a source of the ninth transistor;

an eleventh transistor, wherein a first terminal of the eleventh transistor is connected to the second node, a second terminal of the eleventh transistor is connected to the second timing control terminal, and a third terminal of the eleventh transistor is connected to the signal input terminal; and a first capacitor, wherein a first electrode of the first capacitor is connected to the signal output terminal, and a second electrode of the first capacitor is connected to the gate of the eighth transistor.

17. The display panel according to claim 12, wherein the scan control line driver module further comprises: a timing controller, configured to output a first timing control signal and a second timing control signal.

18. The display panel according to claim 17, wherein the scan control line driver unit circuit is configured to perform delay processing on a signal received from the signal input terminal under control of the first timing control signal and the second timing control signal, and the processed signal is output by the signal output terminal.

19. The display panel according to claim 17, wherein a scanning signal is output by a previous-stage scan control line driver unit to a next-stage scan control line driver unit, and a scanning signal is output by a last-stage scan control line driver unit.

20. The display panel according to claim 17, wherein a first timing control terminal of an odd-stage scan control line driver unit is configured to receive the first timing control signal, and a second timing control terminal of the odd-stage scan control line driver unit is configured to receive the second timing control signal.

* * * * *